Sept. 5, 1939.  J. MIHALYI  2,172,338
LENS MOUNT
Filed Sept. 23, 1937
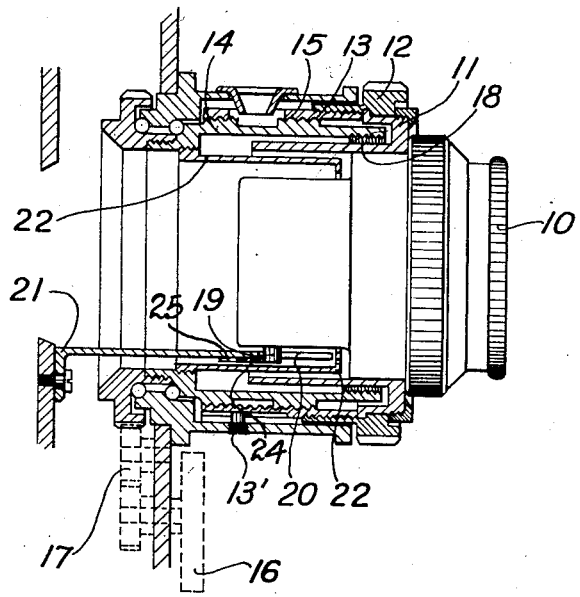
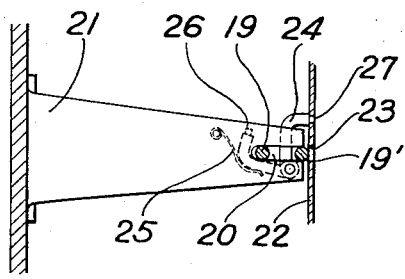
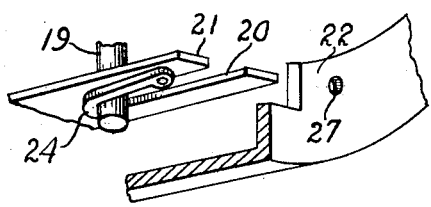
Joseph Mihalyi
INVENTOR
BY
ATTORNEYS

Patented Sept. 5, 1939

2,172,338

UNITED STATES PATENT OFFICE 2,172,338

LENS MOUNT

Joseph Mihalyi, Rochester, N. Y., assignor to Eastman Kodak Company, Rochester, N. Y., a corporation of New Jersey Application September 23, 1937, Serial No. 165,356

3 Claims. (Cl. 95—45)

This invention relates to lens mounts and particularly to lens mounts for interchangeable objectives. It is an object of the invention to provide a lens mount which will permit easy and rapid interchange of objectives of different focal lengths.

It is a special object of the invention to provide a focusing mount having a movable portion for focusing the objective and means whereby an objective when inserted is automatically in focus at the infinity position and when removed automatically locks the focusing mechanism in this infinity position, pending the insertion of another objective.

According to one embodiment of the invention, a pin and slot coupling is provided between the lens mount and a rigid portion of the camera housing. This permits axial motion of the objective for focusing purposes or for removal. A ring connected to the focusing mechanism limits this pin and slot coupling so that the objective cannot be removed except when the focusing mechanism is in the infinity position, at which time, an opening in the ring comes opposite the slot and permits the pin and the lens mount to be easily removed. Furthermore, as the lens mount is removed, a resiliently actuated stud moves into a hole in the limiting ring to prevent any motion thereof during the absence of a lens. Thus the focusing mechanism remains locked in the infinity position ready for the immediate insertion of another or the same lens.

Thus, in an interchangeable lens system in which the focusing mechanism remains secured to the camera housing and a portion of this mechanism is movable for focusing the objective, the invention provides means for restraining the motion of this portion upon removal of the objective. The reinsertion of an objective renders this restraining means inoperative.

Other objects and advantages of the invention will be apparent from the following description of one embodiment of it when read in connection with the accompanying drawing in which:

Fig. 1 is a cross section of a lens mount incorporating the invention.

Fig. 2 is a detail of the locking mechanism.

Figure 3 is an enlarged perspective view of the detail shown in Figure 2.

In Fig. 1 an objective 10 and its mount 11 are detachably mounted on a focusing mount by means of a lock nut 12 having a screw engagement with a tubular member 13 which is held against rotational movement by a pin 13' and adapted to be moved axially upon rotation of a focusing sleeve 14 by means of a threaded connection 15. A pin 19 on the lens mount 11 and movable in a slot 20 of an arm 21 which is rigidly secured to the camera housing, permits axial motion of the objective 10 for focusing purposes.

This axial motion of the tubular member 13 to which the objective mount 11 is secured is transmitted through the screw-thread of the rotatable focusing sleeve 14 which may be actuated through a system of gears 17 from a focusing knob 16. An extra screw-thread 18 not connected to anything in the arrangement, as shown, may be used instead of the screw-thread 13 and thus permits objectives to be inserted in an alternative manner if they are provided with suitably threaded mounts.

According to the invention, the pin 19 cannot be removed from the slot 20 to permit the interchange of lenses except when the focusing sleeve 14 is in the infinity position, at which time an opening 23 in a ring 22 is brought opposite the slot 20. The ring 22 is carried by and rotates with the focusing sleeve 14. This feature is clearly illustrated in Fig. 2.

As shown in Fig. 2 and Fig. 3, when the objective is being removed, the pin 19 moves out of the slot 20, and passes through the opening 23 in the ring 22. A hook-shaped member 24 pivotally mounted on the rigid arm 21 and urged into engagement with the pin 19 by means of a spring 25 rotates as the pin 19 is removed so that when the pin 19 reaches the position indicated at 19' a stud 26 carried by the member 24 engages a hole 27 in the ring 22. This locks the focusing mechanism and restrains the motion of the ring 22 and the rest of the movable portion until the lens is reinserted or another lens inserted carrying a pin similar to pin 19 which releases the stud 26 from the opening 27 and moves the member 24 to the position indicated in broken lines in Fig. 2.

It will be obvious that my invention provides a very simple and practical mechanism to insure easy and convenient interchanging of lenses. Having thus described in detail one specific embodiment of my invention, I wish to point out that it is not limited to the specific structure shown but is of the scope of the appended claims.

What I claim as new and desire to secure by Letters Patent of the United States is:

1. A photographic camera, designed for use with a detachable lens mount having a positioning member, said camera incuding a member movable for focusing the lens when attached thereto, stationary means consisting of an open end slot for receiving the positioning member, and means movable with said focusing member for obstructing said receiving means by obstructing said open end when the focus is set for other than a predetermined distance, and means for engaging and holding said movable means against movement when the focus is set for said predetermined distance, said holding means being movable and so arranged with reference to said receiving means that it is adapted to be released by said positioning member when the lens mount is attached to the camera.

2. In combination with a camera, a camera housing, focusing means rotatably secured to the camera housing and carrying an interchangeable objective mount, a pin and slot coupling comprising a pin on the objective mount and an open end slot in the housing, means limiting the outward movement of the pin in the slot, means attached to the focusing means for removing said limiting means at infinity focus position whereby the objective mount may be removed for interchanging and means operated by said pin and slot coupling locking the focusing means in the infinity position as the objective is removed.

3. In combination with a camera, a camera housing, focusing means rotatably secured to the camera housing and carrying an interchangeable objective mount, a coupling between the objective mount and the housing comprising a pin on one and an open end slot on the other to insure that the objective mount can be interchanged only when so oriented with respect to the housing that said pin is in alignment with the slot, means limiting the outward movement of the pin and slot coupling, means attached to the focusing means for removing said limiting means at infinity focus position whereby the objective mount may be removed for interchanging, means for locking the focusing means in the infinity position as the objective mount is removed, said locking means fastening the focusing means to the housing and consisting of a recess in one, a complementary lug on the other, and resilient means urging the lug into the recess, and a pin carried by the objective mount for disengaging said locking means by forcing the lug from the recess as the mount is inserted in the camera whereby the focusing means is released when an objective mount is in the camera.

JOSEPH MIHALYI.